Jan. 10, 1967  G. BAGNASCO  3,297,110
GENERATOR STARTER USED IN AN ELEVATOR MOTOR DRIVE
Original Filed July 9, 1962  6 Sheets-Sheet 6
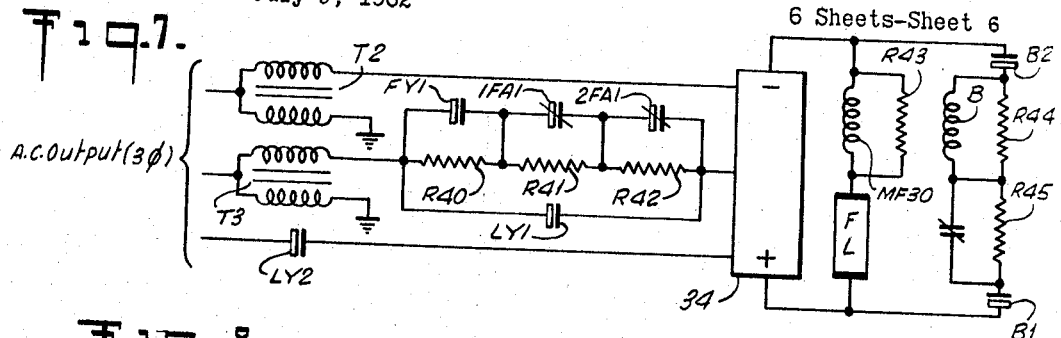
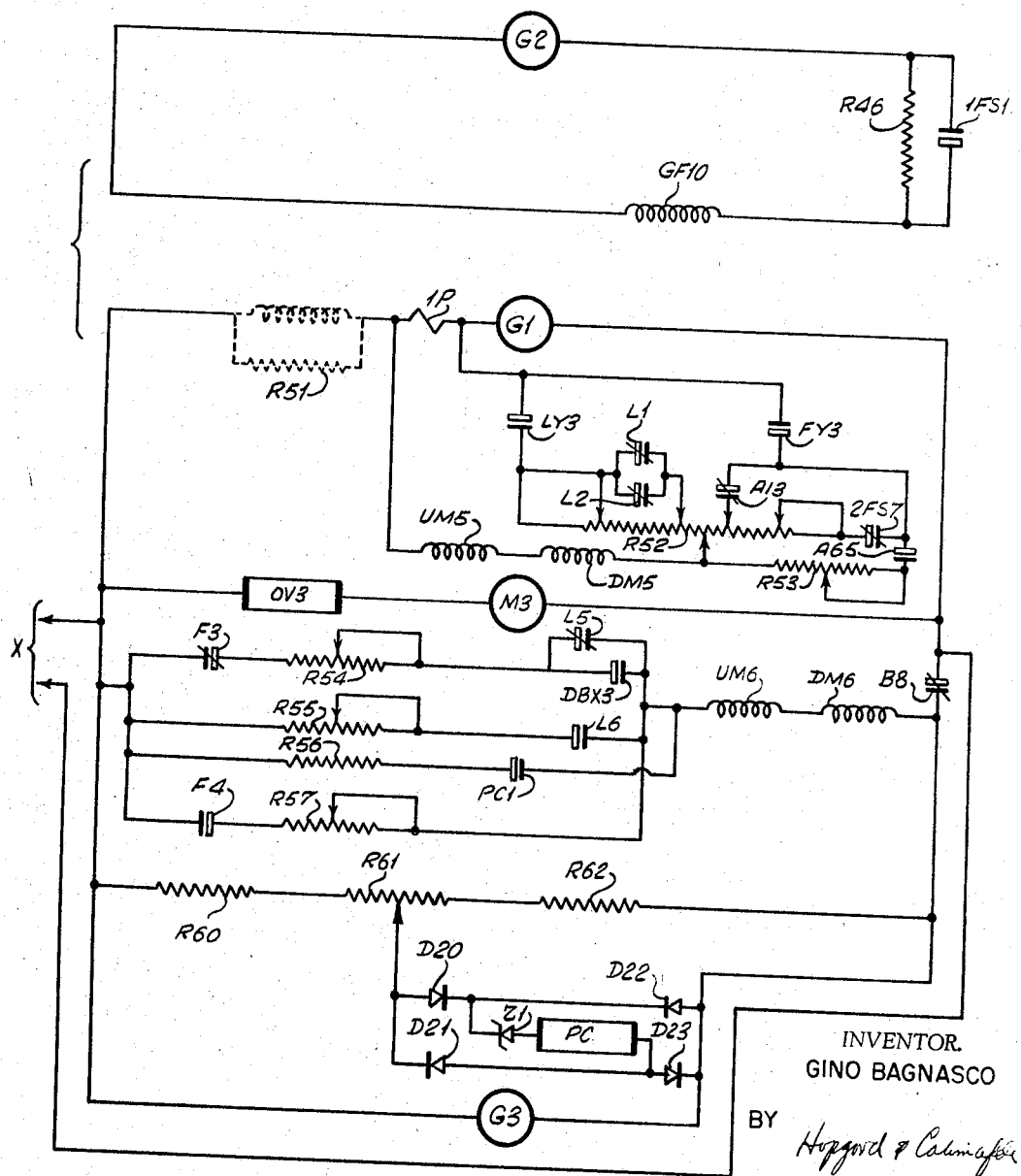
INVENTOR.
GINO BAGNASCO
BY
ATTORNEY

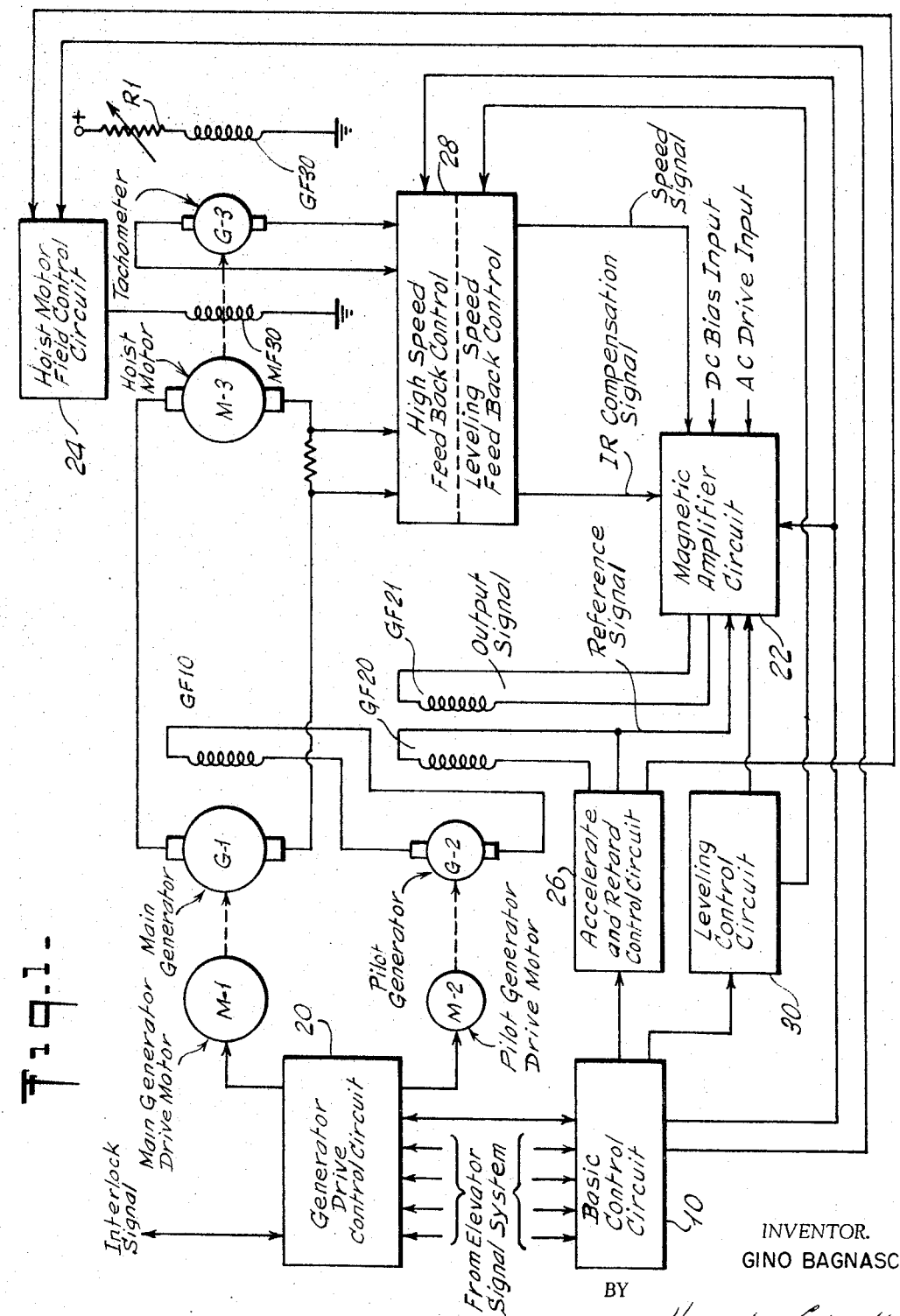

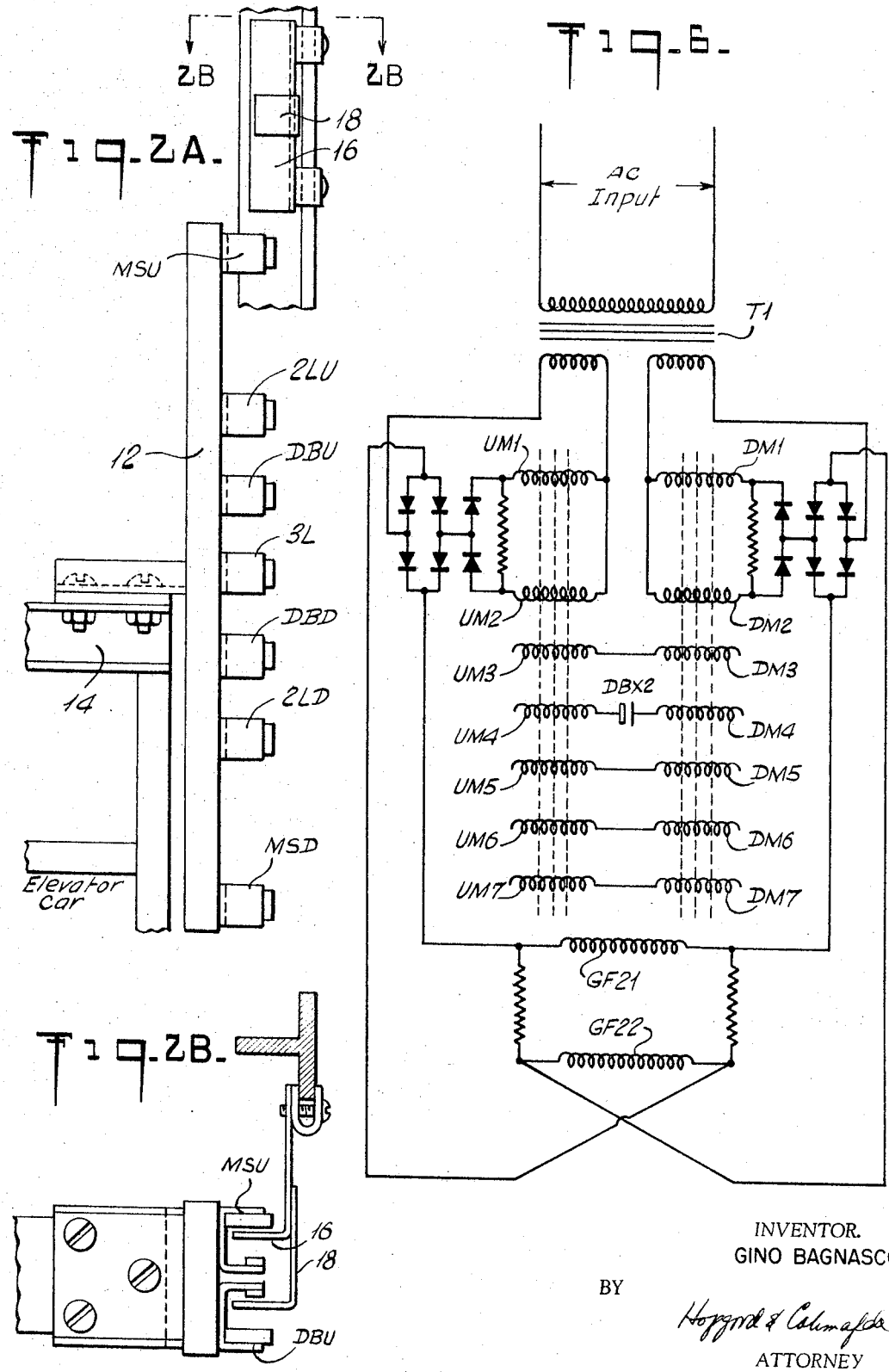

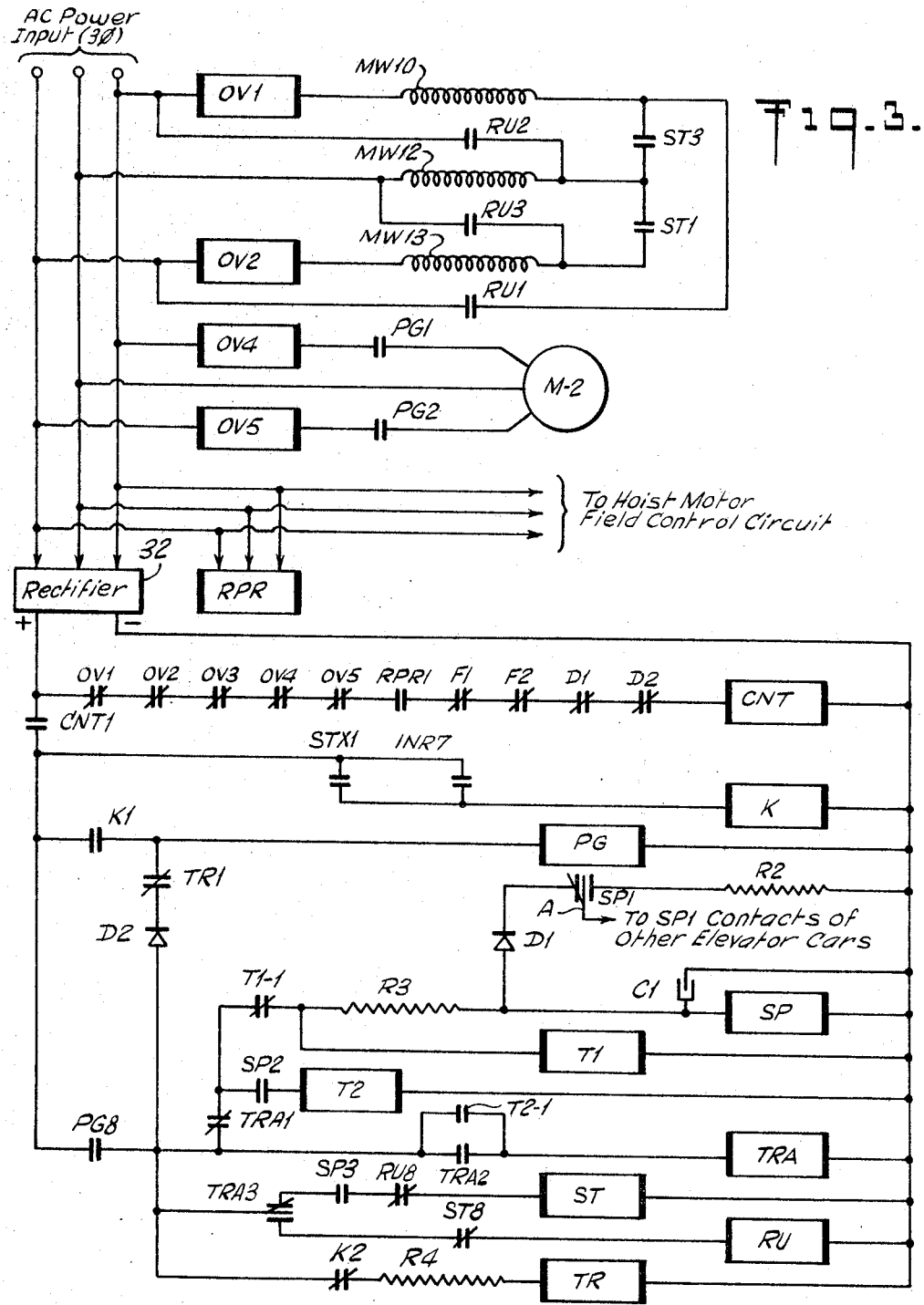

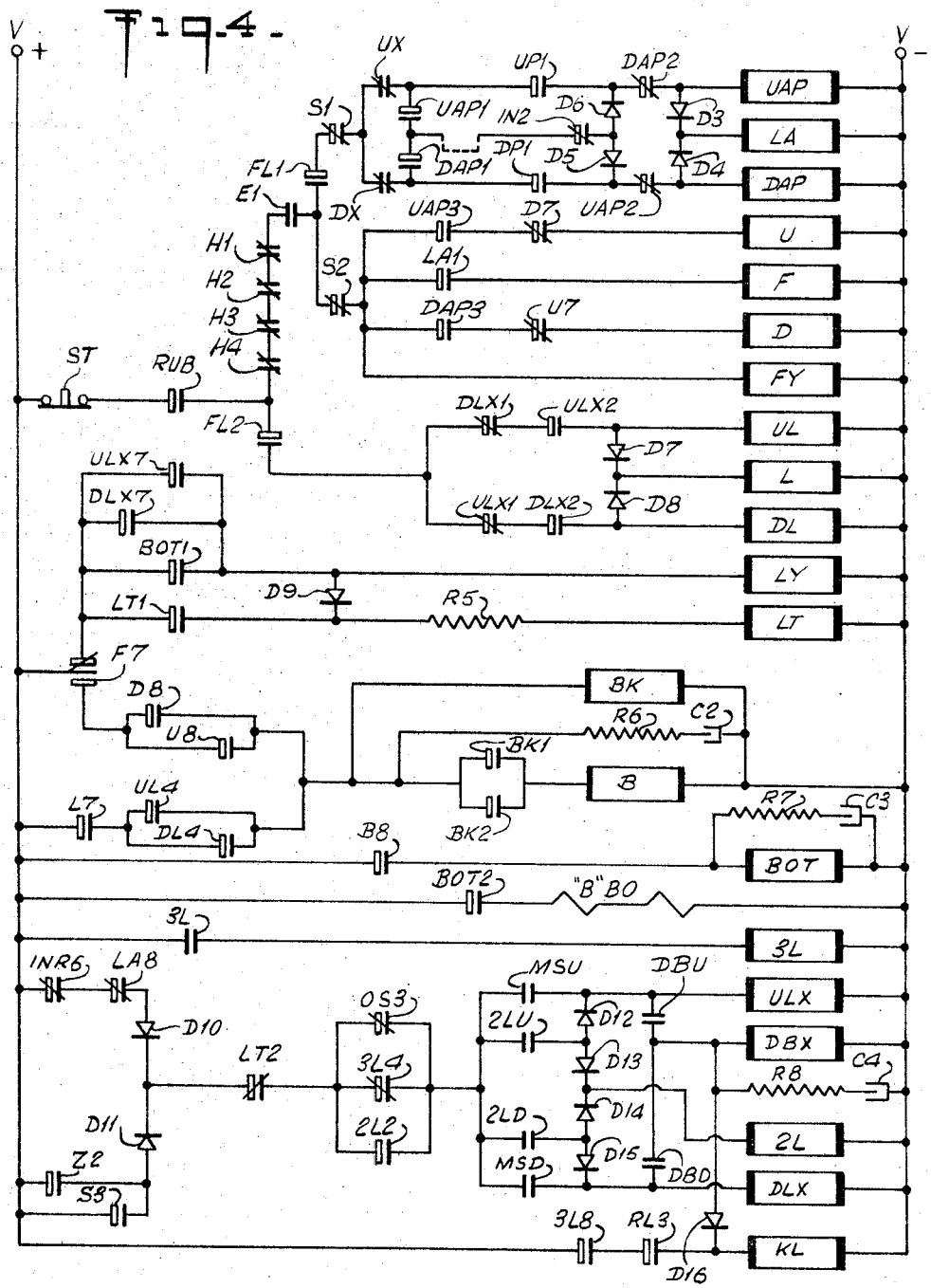

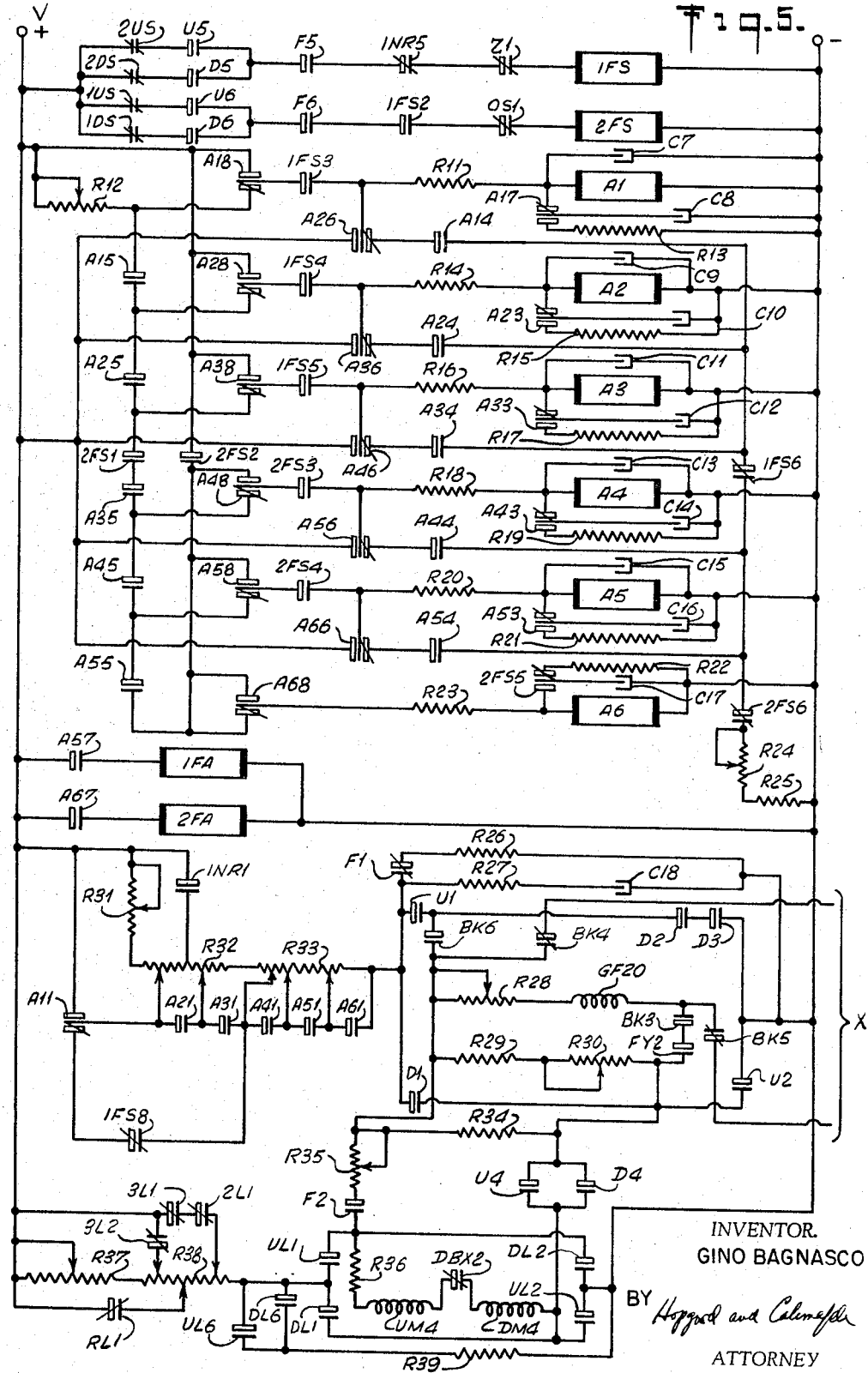

United States Patent Office 3,297,110
Patented Jan. 10, 1967

3,297,110
GENERATOR STARTER USED IN AN ELEVATOR MOTOR DRIVE
Gino Bagnasco, Bronx, N.Y., assignor to Serge Elevator Company, Inc., New York, N.Y., a corporation of New York
Continuation of application Ser. No. 208,513, July 9, 1962. This application Feb. 10, 1965, Ser. No. 431,670
1 Claim. (Cl. 187—29)

This invention relates generally to elevator control systems and more particularly to control systems for D.C. elevators, i.e., elevators that are driven by D.C. hoist motors which receive their power from A.C. driven D.C. generators. This is a continuation of my copending application Serial No. 208,513, filed July 9, 1962, now abandoned.

The control system of this invention is basically a hoist motor control circuit. It receives input instructions from an elevator signal system, which does not comprise a part of this invention, and translates these instructions into the appropriate electrical inputs for the hoist motor which then moves the elevator car in accordance with the input instructions (start upward motion, start downward motion, accelerate, decelerate, stop, etc.). The invention is characterized by a novel closed loop armature and field current control circuit for the hoist motor and by a novel levelling control circuit, a novel accelerate and retard control circuit, a novel dynamic braking circuit, a novel residual squelch circuit, and a novel starting interlock circuit.

Closed loop motor control circuits, per se, have many important advantages over open loop circuits in elevator control systems, but the use of closed loop circuits has been encumbered in the past by components such as rotary amplifiers or the like. The gain of these rotary amplifiers is dependent on critical impedance matching, which means that their gain varies with temperature and with the condition of the motor and generator brushes. This, of course, produces unstable and unreliable operation of the control system and consequently of the hoist motor. In addition, rotary amplifier circuits are relatively complex and relatively costly relative to static amplifiers, and they are much less reliable in operation.

In accordance with this invention, the foregoing drawbacks have been eliminated or materially reduced by providing a closed loop control system that utilizes an amplifier (or the equivalent of) which does not require critical impedance matching, and which is simpler, more reliable, and less expensive than the prior art rotary amplifier systems.

Another shortcoming of the prior art closed loop control system arose when manually operated elevator control systems were converted to automatic operation. The conventional closed loop control systems caused mismatching, as well as other problems, when converting to automatic operation, thereby requiring a new main generator or rewinding the old generator. Since the main generator is as large and as expensive as the hoist motor, this added considerable cost to the replacement system.

In accordance with another aspect of this invention, a control system has been devised which is compatible with almost any main generator, thereby making it possible to modernize elevator control systems without scrapping or rewinding the existing generators.

An additional major drawback of the prior art closed loop circuits is that the high speed and leveling speed modes of operation are controlled by the same circuit. This presents a safety problem and also sacrifices performance at high speed operation or in leveling speed operation or in both. The safety problem resulted from the fact that a malfunction during the leveling operation has more serious consequences when a single control circuit is used. With a single control circuit, it is possible for the elevator car to come up to its stop position from maximum high speed if the speed control circuit should fail.

In accordance with another aspect of the invention, separate control circuits are provided for high speed control and leveling speed control. This provides safer elevator operation and allows the control system to be designed for optimum performance at both high and low speeds.

Further drawbacks of the prior art control systems related to the dynamic braking circuits, accelerate and retard control circuits, levelling circuits, and to other more specific circuits. This invention provides many significant improvements in these circuits, as will be discussed in later paragraphs, and in addition this invention provides a significant reduction in the size of the control unit and in the power rating of the relays used therein. These and many other advantages of the invention will become apparent to those skilled in the art from the following description of one specific embodiment thereof, as illustrated in the attached drawings, in which:

FIG. 1 is a block diagram of one illustrative embodiment of the invention;

FIG. 2A is an elevation view of an array of magnetic position switches mounted on top of an elevator car;

FIG. 2B is a plan section taken on the line B—B of FIG. 2A;

FIG. 3 is a schematic circuit diagram of one suitable mechanization of the generator drive control circuit shown in FIG. 1;

FIG. 4 is a schematic circuit diagram of one suitable mechanization of the basic control circuit shown in FIG. 1;

FIG. 5 is a schematic circuit diagram of one suitable mechanization of the accelerate and retard control circuit and the levelling control circuit shown in FIG. 1;

FIG. 6 is a schematic circuit diagram of one suitable mechanization of the magnetic amplifier circuit shown in FIG. 1;

FIG. 7 is a schematic circuit diagram of one suitable mechanization of the hoist motor field control circuit shown in FIG. 1; and FIG. 8 is a schematic circuit diagram of one suitable mechanization of the feedback control circuits shown in FIG. 1.

In accordance with the basic concept of this invention, the operating condition of a D.C. elevator hoist motor is controlled primarily by an armature current control circuit and secondarily by a field current control circuit. In the armature current control circuit, armature current is controlled by low level D.C. control signals which are amplified in an amplifier or equivalent circuit and applied to one field winding of a D.C. pilot generator, whose output voltage is applied to the field winding of a D.C. main generator that supplies armature current to the D.C. hoist motor. These D.C. control signals preferably include (1) a reference signal, which is responsive to the input instruction signals, and which selects an approximate armature current level for the hoist motor to execute the corresponding instruction, (2) a speed signal, which is generated by a tachometer coupled to the hoist motor, and which automatically reduces the armature current as the hoist motor approaches a predetermined cruising speed, and (3) an IR compensation signal, which is responsive to the armature current level of the hoist motor, and which compensates for the IR drop in the hoist motor armature circuit. The reference signal, speed signal, and IR compensation signal are routed through control circuits which vary the level of the control signals in accordance with the input instructions to produce the correct armature current for the hoist motor.

In addition to the control signals described above, the armature current control circuit also utilizes a low level D.C. accelerate and retard control signal which is applied to a second field winding of the pilot generator. This signal rises or falls according to a predetermined time pattern whenever the elevator is to be accelerated from a stopped condition to cruising speed or decelerated from cruising speed down to leveling speed. The accelerate and retard control signal is generated in a novel accelerate and retard control circuit which is responsive to the input instruction signals. The accelerate and retard control circuit also generates signals that select the appropriate field current level for the hoist motor in its accelerate, cruise, and decelerate modes of operation. These signals are applied to a hoist motor field control circuit, whose output is coupled to the hoist motor field winding.

In addition to the structural units described above, the preferred embodiment of the invention also includes an A.C. drive motor for each of the two D.C. generators, a generator drive control circuit which controls the operation of the two A.C. drive motors, a levelling control circuit which controls the hoist motor during levelling, and a basic control circuit which receives the input instructions and actuates the other circuit units in the proper sequence to carry out the instructions.

FIG. 1 shows one illustrative embodiment of the above described circuits. This embodiment contains a basic control circuit 10 which is adapted to receive input signals from the elevator signal system listed in chart 1 below:

CHART 1

*Input signals from elevator signal system*

(1) STX (Starting Auxiliary Relay) is an instruction to prepare the elevator control system for operation.
(2) DP (Down Pilot Relay) is an instruction to initiate downward motion of the elevator car.
(3) UP (Up Pilot Relay) is an instruction to initiate upward motion of the elevator car.
(4) OS (Overspeed Relay) is an instruction to decelerate the elevator car because it is traveling faster than its normal cruising speed.
(5) Z (Zone Relay) is an instruction to decelerate the elevator car from normal cruising speed to approach speed because it is approaching the selected destination floor.
(6) S (Stop Relay) is a signal indicating that the elevator car has reached the levelling zone for its destination floor.
(7) INR (Inspection Relay) is an instruction to prepare the elevator control system for a maintenance inspection.
(8) D1 (Door Switch) is a signal indicating that the side doors of the elevator are opened.
(9) 1US and 2US (Upper Limit Slow Down) are signals indicating that the elevator car is approaching the top of the elevator shaft.
(10) F1 (Upper Limit Switch) is a signal indicating that the elevator car has reached the top of the elevator shaft.
(11) 1DS and 2DS (Lower Limit Slow Down) are signals indicating htat the elecator car is approaching the bottom of the elevator shaft.
(12) F2 (Lower Limit Switch) is a signal indicating that the elevator car has reached the bottom of the elevator shaft.
(13) MSU, 2LU and 3L (Upward Levelling) are signals indicating that the elevator car is coming into alignment with a floor from below (upward motion).
(14) MSD, 2LD, and 3L, (Downward Levelling) are signals indicating that the elevator car is coming into alignment with a floor from above (downward motion).
(15) DBU and DBD (Dynamic Braking) are sgnals indicating that the elevator car has reached the dynamic braking point in approaching a floor from above (DBD) or below (DBU).

The signals in Chart 1 can be derived from any suitable signal system, many of which are well known to those skilled in the art, but the levelling and dynamic braking signals are preferably derived from a switch arrangement such as disclosed in FIGS. 2A and 2B. As shown in these figs., an array of switches MSU, 2LU, 3L, 2LD, and MSD are mounted in a vertical line along a bracket 12 which is attached to the top 14 of an elevator car. These switches are adapted to engage a relatively long target plate 16 which is mounted on the elevator shaft as shown in FIG. 3B. Target plate 16 is slightly shorter than the distance separating switches 2LU and 2LD, and it is mounted in such fashion as to be centrally aligned with switch 3L when the elevator car is aligned with the corresponding floor. When the elevator approaches the floor from above, the magnetic switches will be actuated in the following sequence: (A) Switch MSD will close, indicating that the elevator is approaching the corresponding floor; (B) Switch 2LD will close, indicating that the elevator is closer to the corresponding floor (Switch MSD opens shortly after switch 2LD closes); (C) Switch 3L will close, indicating that the elevator is still closer to the corresponding floor; and (D) Switch 2LD will open, indicating that the elevator is substantially aligned with the corresponding floor. The up levelling switches (MSU, 2LU, and 3L) will be actuated in a similar sequence when the elevator approaches a floor from below. It should be noted that the above described levelling switch arrangement is not novel, but rather a well known prior art levelling switch array.

The novel portion of the switch arrangement shown in FIGS. 2A and 2B comprises a pair of dynamic braking switches DBU and DBD which are offset from the levelling switches and which engage a relatively narrow target plate 18 that is offset from target plate 16 at the center thereof. These dynamic braking switches and their corresponding target plate are part of a novel dynamic braking circuit which will be disclosed in detail in later paragraphs of this document. At this point it suffices to note that switches DBD and DBU will be actuated momentarily whenever the elevator is a predetermined distance from the floor that it is approaching.

Referring again to FIG. 1, the above noted signals are applied from the elevator signal system and from the elevator shaft to basic control circuit 10, which actuates the other units in the correct sequence to execute the input instructions. The operation of this embodiment of the invention can be most clearly described by tracing through some illustrative operating cycles. The elevator control system is prepared for operation by a starting signal STX (Signal 1 of Chart 1) from the elevator signal system. Signal STX is applied directly to a generator drive control circuit 20, which applies A.C. power to generator drive motors M-1 and M-2, which turn on their respective generators. There is no output voltage from the generators, however, because their field windings are not energized until an instruction to move the elevator is received. (Because of the residual magnetism in the generators, they will produce a small output signal when their field windings are energized but this residual output is cancelled out by a novel residual squelching or killer circuit which will be described in later paragraphs.) Generator drive control circuit 20 preferably contains a starting interlock circuit which is coupled to the generator drive control circuits of the elevator control systems for the other elevators in the same bank. The starting interlock circuit delays the operation of generator drive control circuit 20 if any other elevator motors are being started up at the same time. This lowers the starting surge current in the A.C. power system by insuring that the A.C. motors for each elevator start up at different times. In addition to starting up motors M–1 and M–2 in response to start signal STX, basic control circuit 10 also energizes hoist motor field control circuit 24, which applies an initial level of field current to hoist motor field winding MF30. This means that the hoist motor will start as soon as it receives armature current from main generator G–1, whose output voltage is controlled by the input to field windings GF–20 and GF–21 of pilot generator G–2, which supplies the field current to generator G–1.

The elevator control system is started by a UP (start upward motion) or DP (start downward motion) instruction signal. These signals are generated in the elevator signal system after a destination floor has been selected on the elevator control panel and the elevator car doors have closed.

In response to an UP signal, basic control circuit 10 triggers accelerate and retard control circuit 26, which produces a D.C. output current that increases with time in accordance with a predetermined acceleration function. This D.C. output circuit is applied to field winding GF–20 of pilot generator G–2, thereby producing a rising pilot generator output which excites field winding GF10 of main generator G–1, which supplies armature current to hoist motor M–3. Hoist motor M–3 therefore begins to smoothly accelerate in the desired direction to accelerate the elevator car upwardly. It will be understood by those skilled in the art that there is a substantial current amplification factor between the input to pilot generator field GF20 and the output from main generator M–1, whereby a small current in winding GF20 will produce a large current in the hoist motor armature. When hoist motor M–3 begins to turn, it turns tachometer G–3, which develops a speed input signal to magnetic amplifier circuit 22. The reference signal and IR compensation input signals are also activated at this time due to the outputs of accelerate and retard control circuit 26 and generators G–2 and G–1, respectively.

In addition to providing a rising current in field winding GF20 of pilot generator G–2, accelerate and retard control circuit 26 also produces switching signals that vary the output current of hoist motor field circuit 24. Thus, the torque and speed of hoist motor M–3 is controlled by varying both the armature current and the field current thereof. As hoist motor M–3 is accelerated up toward its cruising speed, the magnitude of the speed signal from tachometer G–3 increases, and in magnetic amplifier circuit 22 the speed signal is connected so as to have an inverse effect, i.e., to reduce the output of pilot generator G–2 when the speed signal rises and to increase the output of pilot generator G–2 when the speed signal drops. This inverse action is adjusted within magnetic amplifier circuit 22 to balance out at the hoist motor's predetermined cruising speed, so that the tachometer output will act as an automatic speed regulator for the hoist motor.

After the elevator car has been brought up to cruising speed, as described above, it will continue to run at cruising speed until it comes close to its destination floor, at which time the elevator signal system generates a slow down signal Z by means of well known prior art signal circuitry. When slow down signal Z is applied to basic control circuit 10, a decelerate operation is initiated in which the output current of accelerate and retard control circuit 26 is progressively dropped to a low level to decelerate the elevator from cruising speed to approach speed. After the elevator car has decelerated down to approach speed, the magnetic switches mounted thereon will begin to make contact with the levelling plate and dynamic breaking plate for the destination floor, thereby generating the levelling signals MSU, 2LU, and 3L. Signal MSU develops a stop signal S in the elevator signal system, and this stop signal is applied to the basic control circuit 10 to switch the motor control system from high speed operation to levelling speed operation. Basically, the change from high speed to levelling speed comprises increasing the gain of magnetic amplifier circuit 22 by means of levelling control circuit 30 and feedback control circuit 28. When the dynamic breaking signal DBU is generated, the gain of magnetic amplifier 22 is increased still further, by means that will be described in detail later, and all of the positive feedback inputs are disconnected from magnetic amplifier circuit 22 so that only the negative feedback input signals remain. This produces a large negative feedback which rapidly brings the elevator car to a stop at the destination floor. As the elevator car comes to a stop, switch 3L is activated, indicating that the elevator car is substantially aligned with the destination floor. If the elevator overshoots the destination floor, the elevator will be relevelled by a novel relevelling circuit, as will be described later. If the elevator does not overshoot, the elevator doors will open to discharge the passengers, and the elevator control system will be back in its initial condition.

Although the general block diagram of FIG. 1 does not show means for executing all of the above noted functions, it does disclose the basic closed loop control system from which the major advantaages of this invention are derived. This basic closed loop control system comprises (1) a main generator coupled to the armature of the elevator hoist motor, (2) a pilot generator coupled to the field winding of the main generator, (3) means for selectively varying the current flow in one field winding of the pilot generator to produce a corresponding variation in the hoist motor armature current, (4) a tachometer coupled to the armature of the hoist motor, and (5) a static amplifier coupled between the tachometer output and one field winding of the pilot generator. This basic combination preferably also includes (6) a feedback control circuit coupled between the tachometer output and the static amplifier input, a second field winding on the pilot generator, (7) and means for selectively varying the current flow in the second field winding of the pilot generator to produce a corresponding variation in the hoist motor armature current. It should be noted that the last named means, which corresponds to the accelerate and retard control circuit, is an open loop entry into the closed loop control system. An additional open loop entry is preferably provided in the static amplifier by coupling the output of the accelerate and retard control circuit to a second input of the static amplifier. This coupling corresponds to the reference input signal to the amplifier. The above noted combination also preferably include an IR compensation signal coupled between the hoist motor armature circuit and a third input of the static amplifier and (8) means for selectively varying the hoist motor field current. The above named structural units and signal couplings define a closed loop control circuit having two branches (the IR compensation branch and speed signal branch) and three open loop entries (the second pilot generator winding, the second amplifier input, and the hoist motor field winding. A fourth open loop entry is preferably provided in the feedback control circuit for switching the closed loop circuit from high speed operation to leveling speed operation. This basic control loop, which comprises the heart of this invention, can be mechanized in many different specific forms to provide a simple, compact, efficient, reliable, and inexpensive elevator control system. It is preferable, however, to employ the specific circuits disclosed in FIGS. 2 through 8, which include a novel starting interlock circuit, a novel levelling circuit, a novel accelerate and retard control circuit, a novel dynamic braking circuit, and other novel circuits as will be discussed below.

FIG. 3 shows one illustrative mechanization for generator drive control circuit 20 of FIG. 1. The operation of this circuit can be best described by tracing through its operating cycle, which begins with A.C. power is applied to the power input terminals. The A.C. power is initially blocked from the windings MW10, MW12, and MW13 of main generator drive motor M–1 and from the windings of pilot generator drive motor M–2 by normally open relay contacts. The A.C. Power is, however, applied to a rectifier 32 and a reverse phase relay PRR, which will be energized if the phase connections of the A.C. input are correct, but not if they are incorrect. When relay RPR is energized, contacts RPR 1 will close, thereby energizing relay CNT and closing contacts CNT1 under normal elevator conditions. Relay CNT will, however, remain de-energized if any one of the overload relays (OV1–OV5) are actuated or if the elevator car is at the extreme bottom or top of the elevator shaft, which opens contacts F1 or F2, or if the side door of the elevator is opened, which opens contacts D1.

When relay CNT is actuated, relay K will be actuated as soon as a start signal STX or an inspection signal INR is applied to the circuit from the elevator signal system. The desired effect of these two input signals is to start motors M–1 and M–2, whose input current is controlled by relays ST, RU, and PG.

When relay K is energized by the above noted signals STX or INR, the pilot generator motor M–2 will be started immediately via contacts PG1 and PG2, since relay PG is energized by contacts K1, but the main generator motor will be delayed if any other main generator motors are starting at the same time. This delay will be provided by starting interlock relay SP and contacts SP1, which are coupled via conductor A to the SP1 contacts of the generator drive control circuits of all other elevator cars in the same elevator car system. Conductors A will be grounded through a low resistance R2 if any SP relay in the elevator car system is actuated, thereby preventing all of the other SP relays from being energized when voltage is applied thereto via normally open contacts PG8 and normally closed contacts TRA1 and T1–1. In this case, the voltage will be shorted to ground through D1 and R2. If none of the other SP relays are energized, however, the cathode circuit of diode D1 will be open and the voltage will energize relay SP. The same voltage will energize a 30 second starting timer relay T1, which automatically de-energizes relay SP after a 30 second starting interval. When relay SP is energized, voltage is applied to a 5 second timer T2 via contacts SP2, and to motor starting relay ST via contacts SP3. This applies A.C. power to the windings of motor M–1 via contacts ST1 and ST3. After a 5 second starting period has elapsed, timer relay T2 is actuated, thereby energizing relay TRA via contacts T2–1. Relay TRA removes power from the starting interlock circuit by opening contacts TRA1 and switches power from start relay ST to run relay RU via contacts TRA3. This switches the windings of motor M–1 to their running hookup via contacts RU1, RU2, and RU3. It will be appreciated by those skilled in the art that normally closed contacts RU8 and ST8 prevent starting relay ST and run relay RU from being energized at the same time.

If the main generator motor M–1 has not been started, as described above, within a 30 second interval, timer T1 will automatically remove the power from starting interlock relay SP to give the other elevator motors a chance to start up. It will be appreciated by those skilled in the art that a failure of relay TRA would otherwise hold relay SP energized, thereby disabling all of the elevator cars instead of just the car associated with the bad TRA relay. It can be seen, then, that the starting interlock circuit of this invention includes not only relay SP, but time T1, timer T2, and relay TRA as well.

After motors M–1 and M–2 have been started, they will remain running through the sealing action of contacts TRA2 and PG8, which hold relays TRA, RU, and PG energized even if relay K drops out. If relay K remains dropped out for longer than a minute, however, relays PG, TRA, and RU will be de-energized by a one minute stop timer relay TR whose contacts TR1 will open to break the sealing circuit.

FIG. 4 shows one illustrative embodiment of basic control circuit 10, which receives input instructions from the elevator signal system and generates signals which are applied to the other circuits in the control system to execute the instructions. The functions of basic control circuit 10 can be broken down into 7 general categories; (1) upward high speed motion, (2) downward high speed motion, (3) upward levelling, (4) downward levelling, (5) dynamic braking, (6) relevelling, and (7) mechanical braking. The relays involved in each one of these basic functions is listed in Chart 2 below.

CHART 2

*Function of relays in basic control circuit*

(1) Upward High Speed Motion: Relays UAP, LA, U, and F.
(2) Downward High Speed Motion: Relays DAP, LA, D, and F.
(3) Upward Levelling: Relays ULX, UL, L, LY, LT, 2L, and 3L.
(4) Downward Levelling: Relays DLX, DL, L, LY, LT, 2L, and 3L.
(5) Dynamic Braking: Relay DBX.
(6) Relevelling: Relay RL.
(7) Mechanical Braking: Relays BK, B, and BOT.

It will be understood by those skilled in the art, of course, that the basic control circuit does not perform the above noted functions, but rather that it generates signals which are used to execute these functions. The operation of this circuit can be best described by considering the functions one at a time.

Let us consider first the case of upward or downward high speed motion, which is initiated by an up signal UP or a down DP from the elevator signal system. Before these signals can have any effect on the circuit, however, the pilot generator and main generator must be running, which closes contacts RU8, the hall doors must be closed all along the elevator shaft, which closes contacts H1 through H4, and current must be flowing through the field of the hoist motor, which closes contacts FL1 and FL2. In addition, the elevator car must not be at its upward limit of travel, which opens contacts UX, or at its downward limit of travel, which opens contacts DX, and the elevator car doors must be closed, which closes contacts E1. Under the above noted conditions, an up signal (which closes contacts UP1) will energize relays UAP, LA, U, and F, as will be readily apparent to those skilled in the art. In the same manner, a down signal DP (which closes contacts DP1) will energize relays DAP, LA, D, and F. These relays initiate the upward or downward movement of the elevator and maintain the movement during high speed operation. When the elevator car comes into the levelling zone for its destination floor, however, the above noted relays will all be de-energized by contacts S1 and S2, which are opened by the first levelling switch at the destination floor (switch MSU for upward motion and switch MSD for downward motion). The above noted relays can also be de-energized by a manual stop switch ST, or by a loss of hoist motor field current, which will open contacts FL1 and FL2, or by the elevator car reaching its upper or lower limit of travel, which will open contacts UX or DX. The relays will also be de-energized by an opening of any one of the hall doors or the elevator car door, which will open one of the contacts H1 through H4 or close the contact E1.

During inspection, relays LA and UAP or DAP are only momentarily energized because their sealing path will be interrupted by contacts IN2 and also by removal of a jumper wire indicated by the dotted lines between contacts IN2 and UAP1 and DAP1. The jumper wire insures momentary operation in case contacts IN2 should fail to open. The up or down signals are generated during inspection by manually operated buttons which close contacts UP1 and DP1 as long as the buttons are depressed and open contacts UP1 and UP2 when the buttons are released.

The levelling relays are prepared for operation by a zone signal Z from the elevator signal system which indicates that the elevator is approaching its destination floor. This signal closes contacts Z2, which apply voltage to magnetic levelling switch contacts MSU, 2LU, 2LD, and MSD via normally closed contacts LT2 (levelling timer), OS3 (overspeed), or 3L4. If the zone signal Z is not generated, power will be applied to the levelling switch contacts via contacts S3, which are closed by the elevator signal system when magnetic switch MSU or MSD are activated at the destination floor. If contacts 53 do not close, the power will be applied via contacts LA8, which close when the high speed relays drop out, except during an inspection, when contacts INR6 will be open. During inspection, leveling is accomplished by the above described manual control circuit rather than the automatic leveling circuit. After power has been applied to the magnetic switch contacts, relays ULX or DLX will be energized as soon as magnetic switches MSU or MSD are activated in the elevator shaft. Relays ULX or DLX will energize relays UL and L or DL and L, which activate the upward and downward levelling circuits, respectively. When magnetic switches 2LU or 2LD are activated, relay 2L will be energized and a holding voltage will be applied to relays DLX or ULX via diodes D15 and D14. When magnetic switch 3L is activated, relay 3L will be energized directly via contacts 3L. Shortly after magnetic switch 3L is activated, switches 2LU or 2LD will be de-activated, which will drop out relays 2L, DLX or ULX, UL or DL, and L.

The above described levelling sequence is limited in time by a 5 second levelling timer relay LT, which is automatically energized if relays ULX or DLX do not drop out within 5 second after being energized. Levelling timer relay LT seals itself closed via the normally closed contacts of F7 and normally open contacts LT1. This holding circuit will be broken the next time that relay F is energized, which will occur when the next up signal UP or down signal DP is received from the elevator signal system. When energized, levelling timer relay LT removes power from relays ULX, DBX, 2L, and DLX via normally closed contacts LT2.

With regard to the above described circuits, it should be noted that the high speed relays (UAP, LA, DAP, U, F, D, and FY) are all dropped out when the levelling relays (ULX, 2L, DLX, and 3L) are energized. This means that all of the high speed motor control circuits will be inactive during levelling speed operation and vice versa. It should also be noted that all of the levelling circuits except relay 3L drop out when the elevator car is aligned with its destination floor.

In addition, it should be noted that in the case of an overspeed condition, the voltage will be removed from the leveling relays when contacts 2L2 and 3L4 open, which will disable the leveling circuit to prevent automatic releveling from a long overshoot. When the elevator automatically relevels from a long overshoot, it will overshoot on the relevel, and possibly on the re-relevel and the re-relevel, which is unpleasant for the passengers. Therefore, in accordance with this invention, the leveling circuit is disabled in an overspeed condition, and if releveling is necessary, it will be done manually.

The dynamic braking and re-levelling circuits are quite simple. Relays DBX (dynamic braking) and RL (re-levelling) are energized when magnetic switches DBU or DBD are activated and held energized for a short time after these switches drop out by capacitor C4 and resistor R8, as will be readily apparent to those skilled in the art. Relay DBX will drop out automatically when the elevator car is approximately level with its destination floor, but relay RL will remain energized via contacts 3L8 and RL3 as long as magnetic switch 3L is activated. Relay RL selects the slowest elevator speed for releveling, which will be initiated if the elevator overshoots by the re-activation of magnetic switches 2LU or 2LD.

The mechanical braking relays (BK, B, and BOT) are adapted to drive a fail-safe mechanical hoist motor brake, i.e., a brake that is applied by turning the actuating current off rather than on. Therefore, these relays will be energized when the brake is to be released, and de-energized when the brake is applied. In high speed operation, these relays are energized via contacts F7 and D8 or U8, and in levelling speed operation they are energized via contacts L7 and UL4 or DL4. Relay BK energizes relay B, which is the brake actuating relay, and relay B energized relay BOT, which is a blow out timer relay. Relay BOT actuates a brake blow out mechanism BBO for a predetermined time interval at the start of the braking operation. When the elevator car enters the final stage of the levelling operation, i.e., when magnetic levelling switch 3L is activated, relay BK will drop out after a short time delay due to the opening of contacts L7, UL4 and DL4. The time delay is due to R6 and C2, which old relay BK energized for a time period proportional to the discharge time of C2. This time delay is set so that relay BK will drop out after the dynamic braking has taken effect, when the elevator car is level with its destination floor. When relay BK drops out, relay B drops out, thereby applying the mechanical brake, and relay BOT drops out after a short time delay determined by R7 and C3, thereby actuating the brake blow out mechanism. The circuit will be returned to its original state by the next up signal UP or down signal DP, which will apply power to relay BK again via the normally open side of contacts F7, which are closed during the high speed phase of operation.

FIG. 5 shows a concrete embodiment of the novel accelerate and retard circuit of this invention along with the novel levelling control circuit and portions of the novel dynamic braking circuit. The accelerate and retard control circuit includes the following relays: 1FS, 2FS, A1 through A6, 1FA, and 2FA. Relay 1FS is energized by an up signal U or a down signal D and a high speed operation signal F from basic control circuit 10. Relay 1FS energizes relay A1, which initiates the generation of a rising current in field winding GF20 of pilot generator G–2, as will be explained later, and also energizes relay 2FS, which controls the maximum current flow through field winding GF20. When relay 2FS is energized, the current in winding GF20 will automatically rise to its maximum value, but when relay 2FS is de-energized, the current will drop back by stages to a predetermined fraction of its maximum value. Relay 2FS is used to slow down the elevator when an overspeed condition exists, which will open contacts OS1 and de-energize relay 2FS, or when the elevator is approaching the top or bottom of the elevator shaft, which opens first slow down contacts 1US or 1DS and de-energizes relay 2FS. Shortly after first slow down contacts 1US or 1DS close, second slow down contacts 2US or 2DS will open, thereby de-energizing relay 1FS and dropping the current in generator field GF20 to a relatively low level. If the elevator travels too far after the second slow down contacts have opened, the upper or lower limit contacts F1 or F2 (FIG. 3) will open and turn off the entire elevator control system. It should be noted, however, that the above noted action only occurs when an overspeed condition exists or when the elevator car overshoots the uppermost or lowermost floor of the elevator shaft. Under normal conditions, relays 1FS and 2FS are both energized, which means that the current through field winding GF20 will build up to its maximum value.

The build up of current through field winding GF20 is accomplished by progressively lowering the resistance in series with the winding. At the start of a high speed operation, the series circuit for GF20 includes all of R31, R32, and R33. The current through GF20 is progressively increased by progressively shorting out portions of these resistors by actuating the relays A1, A2, A3, A4, A5 and A6 in sequence. This produces a rising current function which is used to accelerate the hoist motor. After building up to its maximum value, the current through GF20 is progressively decreased by de-energizing relays A1, A2, A3, A4, A5, and A6 in reverse order. This produces a falling current function which is used to decelerate the hoist motor.

When relay 1FS is actuated, relay A1 is actuated via resistor R12, the normally closed side of contacts A18, contacts 1FS3, and resistor R11. The actuation of relay A1, however, is delayed for a predetermined time interval by capacitors C7 and C8, which must charge up to the appropriate voltage level before relay A1 will be actuated. This delay time can be adjusted by varying the resistance of R12, which, along with R11, determine the charging time of C7 and C8. When relay A1 is actuated, it seals itself closed via the normally open side of contacts A18, and applies voltage to relay A2 via resistor R12, contacts A15, the normally closed side of contacts A28, contacts 1FS4, and resistor R14. The actuation of relay A2, however, will be delayed by the charge times of capacitors C9 and C10, which is determined by the values of resistors R12 and R14. When relay A2 is actuated, it seals itself closed via contacts A28 and applies voltage to relay A3 via resistor R12, contacts A25, the normally closed side of contacts A38, contacts 1FS5, and resistor R16. The actuation of relay A3 will be delayed by the charging time of capacitors C11 and C12, which is determined by the values of resistors R12 and R14. If relay 2FS is not actuated, the sequence of relay actuation will stop with relay A3, since the voltage input to relays A4 and A5 will be blocked by normally open contacts 2FS3 and 2FS4. If relay 2FS is energized, however, relays A4, A5, and A6 will also be actuated in sequence with a predetermined time delay between each step of the sequence by the above described process. It should be noted that the delay time for the actuation of each relay in the foregoing sequence is determined in part by the setting of resistor R12 and in part by the value of the individual registor in series with each relay. This means that the delay time for each individual step of the sequence can be set to any desired value by selecting the appropriate individual resistor, and that the total time for the sequence can be changed by adjusting R12. The delay time for each individual step and the total time for the entire sequence is set in accordance with the hoist motor characteristics to produce a smooth acceleration from zero to rated cruising speed.

The normal deceleration process is initiated by the zone signal Z, which indicates that the elevator car is approaching its selected destination floor. Zone signal Z opens normally closed contacts Z1, which de-energizes relays 1FS and 2FS, which opens contacts 1FS3, 1FS4, 1FS5, 2FS3, and 2FS4. Relays A1 through A5, however, will remain energized by a second sealing circuit which applies +V to the left side of each relay via the normally open side of contacts A26, A36, A46, A56, and A66. The voltage supply to relay A6, however, will be interrupted by the opening of contacts 2FS1 and 2FS2, whereby relay A6 will drop out and interrupt the sealing circuit of relay A5 via contacts A66, which will couple capacitor C15 to a discharge path including resistor R20, the normally closed side of contacts A66, contacts A54, contacts 2FS6, resistor R24 and R25. Relay A5 will then drop out after a time delay whose length is determined by the values of resistors R20, R24, and R25. When relay A5 drops out, it will interrupt the sealing circuit of relay A4 via contacts A56, which will couple capacitor C13 to a discharge path including resistor R18, the normally closed side of contacts A56, contacts A44, contacts 2FS6, resistor R24, and resistor R25. Relay A4 will then drop out after a time delay determined by the value of resistors R18, R24, and R25. If relay 1FS has remained energized, as it would for an overspeed slowdown, the deceleration sequence would end with relay A4, since relays A1, A2, and A3 would be sealed through contacts 1FS3, 1FS4, and 1FS5, and the discharge path for relays A1, A2, and A3 would be blocked by contacts 1FS6. Under normal conditions, however, relay 1FS will be de-energized and relays A3, A2, and A1 will drop out in sequence after a time delay determined by their indvidual resistor and resistors R24 and R25. After delay A1 has dropped out, the circuit will be returned to its original condition, and the current thtrough generator field winding GF20 will be brought back to the initial low level as determined by the full resistance of resistors R31, R32, and R33.

The most important feature of this novel accelerate and retard circuit is that it contains independent adjustments for the total accelerate time and the total decelerate time. Resistor R12 sets the total accelerate time, and resistors R24 and R25 set the total decelerate time. An examination of the circuits involved will show that the value of registor R12 has no effect on the decelerate time and that the value of resistor R25 has no effect on the accelerate time. This contrasts sharply with the prior art circuits, in which the accelerate and decelerate time was controlled by a common adjustment. A second important feature is the split level control for the maximum current level, which is provided by relays 1FS and 2FS. This split level control allows the elevator hoist motor to be smoothly decelerated to a lower speed to compensate for an overspeed condition, and it also assures safe operation when the elevator is near the top or bottom of the elevator shaft. Another important feature is the small number of relays and contacts used to perform the complex functions involved.

Before describing the levelling and dynamic braking portions of the circuit in FIG. 5, it will be convenient to first describe the magnetic amplifier circuit shown in FIG. 6, since the magnetic amplifier is used in both the levelling and dynamic braking circuits. The magnetic amplifier per se consists of two saturable cores, which are indicated in FIG. 6 by the parallel pairs of dotted lines, on which are wound a plurality of windings UM1 through UM7 and DM1 through DM7. Windings UM1 and UM2 serve as output windings for one of the saturable cores, and windings DM1 and DM2 serve as output windings for the other saturable core. The other windings serve as control windings for their respective output windings. Each of the cores and their respective windings comprise an independent magnetic amplifier, but in this particular circuit arrangement the independent magnetic amplifiers are connected together to form a single, push-pull magnetic amplifier circuit. The output of this push-pull circuit is connected to pilot generator field winding GF21, which is shown in FIG. 1, and to another pilot generator field winding GF22, which is not shown in FIG. 1.

The output windings UM1, UM2, DM1, and DM2 are excited by A.C. voltage from corresponding secondary windings of an A.C. input transformer T1 via two rectifying bridge circuits which are coupled to pilot generator field windings GF21 and GF22. It will be apparent to those skilled in the art that the rectifier circuits apply the same polarity of voltage to both ends of the pilot generator field windings GF21 and GF22.

Under zero input conditions, the voltage is the same at both ends of windings GF21 and GF22, which means that no current will flow through the windings. To develop an output signal, the output level of each magamp is unbalanced by the input signals to cause current to flow in one direction or the other through the windings, depending on whether the elevator is to be driven up or down. It will also be clear that the magnitude and the direction of the current flow on each GF21–GF22 will depend on the magnetization level of both of the magnetic cores, and that the magnetization level of the cores will be determined by the algebraic sum of the D.C. currents flowing in control windings UM3 through UM7 and DM3 through DM7. Therefore, the direction and amount of the average D.C. current flow through pilot generator field windings GF21 and GF22 will be controlled by the algebraic sum of the D.C. current flow through control windings UM3 through UM7 and DM3 through DM7.

The control windings are connected together in the following series pairs: (1) UM3 and DM3, (2) UM4 and DM4, (3) UM5 and DM5, (4) UM6 and DM6, and (5) UM7 and DM7. In each of these winding pairs, the two windings are connected in series opposition so that current flow in one direction through the winding pair will increase the output voltage of one magamp and decrease the output voltage of the other, while current flow in the other direction will reverse the situation. This provides the unbalanced condition noted above. The input signals shown in FIG. 1 are each applied to a corresponding pair of windings in the proper polarity to produce the desired negative or positive feedback. The D.C. bias input is applied to windings UM3 and DM3 from a D.C. bias source which is not shown but which will be apparent to those skilled in the art. The reference signal input is applied to windings UM4 and DM4 by the means shown at the bottom of FIG. 5. The IR compensation signal and speed signal are applied respectively to windings UM5–DM5 and UM6–DM6 as shown in FIG. 8. The winding pair UM7–DM7 does not receive an input signal, but is rather coupled to a damping circuit, not shown in the drawings, which serves to load the magnetic core circuits and control the rate of flux changes therein so as to eliminate hunting in the control loop, as will be readily understood by those skilled in the art. The reference and IR compensation signal are positive feedback signals, i.e., an increase in their current level causes an increase in the current through windings GF21 and GF22. The speed signal, however, is a negative feedback signal, i.e., an increase in its current level causes a decrease in the current through generator windings GF21 and GF22. The novel dynamic braking circuit of this invention comprises the very simple operations of disconnecting the positive reference input by means of contacts DBX2 and by increasing the level of the negative feedback inputs so as to develop a strong negative output from the magnetic amplifier, which will tend to drive the hoist motor in the reverse direction and thereby bring it to a stop very quickly. The exact method by which the negative inputs are increased will be discussed in connection with the feedback control circuits disclosed in FIG. 8.

Referring again to FIG. 5, the novel levelling and relevelling circuit of this invention comprises using the reference signal windings UM4 and DM4 of the magnetic amplifier as a levelling input winding during the levelling and relevelling phases of operation. During the high speed phase of operation, windings UM4 and UM5 are coupled in parallel with pilot generator field GF20 via resistor R36, contacts F2, resistor R35, resistor R28, contacts BK3 and FY2, and contacts U4 or D4. When the high speed phase of operation ends, however, contacts F2 open and windings UM4 and UM5 are connected across a variable voltage divider comprising resistors R37, R38, and R39 by contacts UL1 and UL2 or DL1 and DL2. It should be remembered that the switch over from high speed operation to levelling speed operation occurs when mangetic switch MSU or MSD is actuated. In the first approach to the floor the elevator will level at one speed due to contacts RL1 bypassing the effect of the 2L and 3L contacts opening. When the magnetic switches DBU or DBD are actuated, the current through windings UM4 and DM4 will be completely interrupted by the opening of contacts DBX2, to perform the above described dynamic braking, and contacts RL1 will be opened at the same time, since the relevelling relay RL is actuated at the same time as the dynamic braking relay. Contacts DBX2 will reclose when the elevator car is approximately level with its destination floor, but contacts RL1 will remain open, which places the circuit at its lowest speed for relevelling. When the elevator is approximately level with the destination floor, the UL and DL contacts will open, thereby interrupting all current flow through windings UM4 and DM4. If the elevator overshoots, however, or if it rises due to cable stretch when the passengers are discharged, the UL or DL contacts will close again, thereby forcing a low level of current through windings UM4 and DM4, thereby relevelling the elevator at its lowset speed. When the relevelling is completed, the UM and DM contacts will open again, thereby terminating the levelling operation.

In the circuit of FIG. 5, pilot generator field winding GF20 is also used as part of a novel residual killer circuit for eliminating output from the main generator under zero excitation conditions. There will be an output from the pilot generator and from the main generator even when no current is flowing through their field windings because of residual magnetism in the generator pole pieces. In accordance with this invention, however, the residual output is killed by connecting the main generator output across winding GF20 and also across magamp input windings UM6 and DM6 (FIG. 8) when the elevator is standing still. The connection to winding GF20 is made by way of input X, which is connected across winding GF20 by contacts BK4 and BK5 whenever the mechanical brake is applied. The connection, of course, is a negative feedback connection in which an increase in the main generator output tends to reduce the main generator output. This negative feedback drives the residual output down to a low level.

FIG. 7 show sone suitable mechanization of hoist motor field control circuit 24. In this mechanization, two phases of the three phase input are raised in voltage by means of autotransformers T2 and T3. The output of the autotransformers is applied to a three phase rectifier 34, whose output is applied to the hoist motor field winding MF30 and mechanical brake solenoid B. Relay FL, which is connected in series with winding MF30, is the motor field relay, which drops out when the motor field current fails and disconnects the high speed drive circuit (FIG. 4). The current through winding MF30 is controlled by a resistor-contact network on the A.C. side of rectifier 34. This resistor-contact network is operable to decrease the hoist motor field current when the hoist motor speed is increased and to apply a very large current to the hoist motor field during the levelling operation. When the elevator is stopped, resistor R40 is in series with the A.C. input. When the elevator doors close, resistor R40 is shorted out by contacts FY1, which brings the hoist motor field current up to its starting level. When the hoist motor approaches full speed, contacts 1FA1 and 2FA1 open (see FIG. 5), which reduces the field current to running level by connecting R41 and R42 in series with the A.C. input. When the elevator switches from high speed to levelling speed operation, resistors R41 and R42 are shorted out by contacts LY1, which raises the field current back to its starting level, and the field current is increased still further by connecting the third phase of the A.C. input to recitfier 34 by means of contacts LY2. In this particular hoist motor field control circuit, the field current is controlled on the A.C. side of the rectifier rather than on the D.C. side as has been done in the past.

This is a very important feature of this invention because it substantially reduces the size and power rating of the switch contacts and eliminates arc blow out devices from the circuit. The hoist motor field control circuit of this invention uses contacts that are one-tenth the size of the prior art field control circuits, which controlled the current on the D.C. side of the rectifier rather than the A.C. side.

FIG. 8 shows one mechanization of the feedback control circuit 28. At the top of FIG. 8 is shown the switching circuit for the output of pilot generator G-2, which is applied to field winding GF10 of main generator G-1. In this circuit, the current through winding GF10 is increased during high speed operation by closure of contacts 1FS1 and decreased during levelling operation by the opening of contacts 1FS1. The lower portion of FIG. 8 shows the feedback switching circuits for the IR compensation signal, which is applied to magnetic amplifier windings UM5-DM5, and the speed signal, which is applied to magnetic amplifier windings UM6-DM6.

The IR compensation signal is developed across the interpole resistance IP of main generator G1. The voltage drop across the interpolar resistance, of course, will be directly proportional to the main generator output current, which is applied to the armature of hoist motor M3 through overload relay OV3, which turns the control system off in case of an overload. The voltage drop across the interpolar resistance is applied to magnetic amplifier windings UM5-DM5 via a switching network which changes the feedback amplitude in accordance with the elevator operating conditions. The switching circuit has two branches: a high speed branch, which is connected by contacts FY3, and a levelling branch, which is connected by contacts LY3. The switching action of this circuit will be apparent to those skilled in the art, inasmuch as all of the relays involved have been previously described.

In the speed signal portion of this circuit, the output of tachometer generator G3 is applied to magnetic amplifier windings UM6-DM6 via a resistor-contact switching network which changes the feedback amplitude in accordance with the elevator operating conditions. It should be noted that the output of the main generator M3 is connected to windings UM6-DM6 via contacts B8, L5, and F3 when the elevator is stopped. This is a part of the residual squelcher circuit for reducing the residual output of the main generator when the elevator is stopped. When the elevator is in motion, however, contacts B8 are opened, which disconnects windings UM6-DM6 from the main generator. The current through windings UM6-DM6 is then determined by the output of tachometer generator G3 and by the feedback switching circuit.

All of the relays in the feedback switching circuit have been described previously except for peak limiting relay PC, which is energized at a predetermined tachometer output voltage level by the breakdown of a Zener diode Z1. The diodes D20, D21, D22, and D23 comprise a rectifier bridge circuit which insures that the voltage applied to Zener diode Z1 will be correct regardless of the output polarity of tachometer generator G3, whose polarity depends on the elevator's direction of travel. When relay PC is energized, the current flow through windings UM6-DM6 is increased by the closure of contacts PC1. This reduces the elevator's speed by a predetermined increment, thereby compensating for the overspeed condition which caused Zener diode Z1 to break down. The peak limiting circuit makes an important contribution to the regulation of elevator speed, which is held within ±1% in the control system of this invention.

From the foregoing description it will be apparent that this invention provides a closed loop elevator control system which is simpler, more reliable, more efficient, and less expensive than those heretofore known in the art. It will also be apparent that this invention provides a novel levelling circuit, a novel dynamic braking circuit, a novel accelerate and retard control circuit, a novel residual killer circuit, and a novel starting interlock circuit. And it should be understood that this invention is by no means limited to the specific embodiment disclosed herein, since many modifications can be made in the disclosed circuits without departing from the basic closed loop control system of this invention. Therefore, this invention includes all elevator control systems falling within the scope of the following claim.

What is claimed is:

In an elevator control system containing a main generator and means for generating a start signal, a starting interlock circuit comprising a start relay coupled to said start signal to be energized thereby, means for shorting said start relay to prevent energization when the start relay of another elevator control system is energized, a first timing relay coupled to said start signal to be energized thereby, said first timing relay being operable to de-energize said start relay at the end of a predetermined maximum starting time interval, a second timing relay coupled to said start relay to be energized thereby, said second timing relay being operable to de-energize said start relay at the end of a predetermined normal starting time interval and to energize a main generator relay, said start relay being coupled to said main generator to apply starting power thereto, said main generator relay being coupled to said main generator to apply running power thereto, means for preventing the start relay and the main generator relay from being energized at the same time, and means for de-energizing the main generator relay in response to a stop signal to de-energize the main generator.

References Cited by the Examiner

UNITED STATES PATENTS

| | | | |
|---|---|---|---|
| 2,785,362 | 3/1957 | Harding et al. | 318—143 |
| 2,853,668 | 9/1958 | Moore | 318—143 |
| 2,918,987 | 12/1958 | Haase et al. | 187—29 |
| 2,978,070 | 4/1961 | Hesse et al. | 187—29 |

ORIS L. RADER, *Primary Examiner.*

T. LYNCH, *Assistant Examiner.*